United States Patent
Gupta et al.

(10) Patent No.: US 7,966,294 B1
(45) Date of Patent: Jun. 21, 2011

(54) USER INTERFACE SYSTEM FOR A CLUSTERED STORAGE SYSTEM

(75) Inventors: Vinay Gupta, Sunnyvale, CA (US); John Meneghini, Waltham, MA (US); Steven R. Klinkner, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 734 days.

(21) Appl. No.: 10/797,669

(22) Filed: Mar. 10, 2004

Related U.S. Application Data

(60) Provisional application No. 60/534,913, filed on Jan. 8, 2004.

(51) Int. Cl.
*G06F 17/30* (2006.01)
(52) U.S. Cl. ........................................................ 707/654
(58) Field of Classification Search .................. 707/654, 707/645
See application file for complete search history.

(56) References Cited

U.S. PATENT DOCUMENTS

| | | | |
|---|---|---|---|
| 4,878,726 A * | 11/1989 | Fatehi | 385/16 |
| 4,937,763 A | 6/1990 | Mott | |
| 5,067,099 A | 11/1991 | McCown et al. | |
| 5,157,663 A | 10/1992 | Major et al. | |
| 5,633,999 A | 5/1997 | Clowes et al. | |
| 5,781,770 A | 7/1998 | Byers et al. | |
| 5,812,748 A | 9/1998 | Ohran et al. | |
| 5,812,751 A | 9/1998 | Ekrot et al. | |
| 5,951,695 A | 9/1999 | Kolovson | |
| 6,052,795 A * | 4/2000 | Murotani et al. | 714/3 |
| 6,119,244 A | 9/2000 | Schoenthal et al. | |
| 6,292,905 B1 | 9/2001 | Wallach et al. | |
| 6,421,711 B1 * | 7/2002 | Blumenau et al. | 709/213 |
| 6,515,968 B1 * | 2/2003 | Combar et al. | 370/252 |
| 6,580,709 B1 * | 6/2003 | Gorshe et al. | 370/352 |
| 6,625,747 B1 * | 9/2003 | Tawil et al. | 714/6 |
| 6,625,749 B1 | 9/2003 | Quach | |
| 6,629,156 B1 * | 9/2003 | Odenwald et al. | 710/8 |
| 6,728,849 B2 * | 4/2004 | Kodama | 711/162 |
| 6,728,897 B1 | 4/2004 | Cramer et al. | |
| 6,748,510 B1 * | 6/2004 | Coatney | 711/170 |
| 6,775,702 B2 | 8/2004 | Oeda et al. | |
| 6,813,698 B2 * | 11/2004 | Gallo et al. | 711/170 |
| 6,854,072 B1 * | 2/2005 | Cagle et al. | 714/15 |
| 6,895,461 B1 * | 5/2005 | Thompson | 710/305 |
| 6,920,579 B1 * | 7/2005 | Cramer et al. | 714/4 |
| 6,920,580 B1 * | 7/2005 | Cramer et al. | 714/4 |
| 6,988,149 B2 * | 1/2006 | Odenwald | 709/250 |
| 6,996,587 B2 * | 2/2006 | Wagener et al. | 707/204 |

(Continued)

OTHER PUBLICATIONS

"GUI vs. CLI: A Qualitative Comparison" by Greg Afinogenov—Posted on Sep. 3, 2003 07:19:51 UTC at http://www.osnews.com/printer.php/4418/GUI-vs.-CLI-A-Qualitative-Comparison.*

(Continued)

*Primary Examiner* — Mark Andrew X Radtke
(74) *Attorney, Agent, or Firm* — Cesari and McKenna, LLP

(57) ABSTRACT

A user interface system simplifies management of a clustered storage system by a user or system administrator. The user interface system comprises a Command Line Interface (CLI) and/or a Graphical User Interface (GUI) that supports virtual ports associated with a single physical port and multi-mode operation of ports in the clustered storage system. Management of the clustered storage system is further simplified through the use of a novel command set used to, inter-alia, set a cluster mode and set a USE_PARTNER attribute of an initiator group (igroup).

52 Claims, 8 Drawing Sheets

U.S. PATENT DOCUMENTS

| | | | | |
|---|---|---|---|---|
| 7,039,827 B2* | 5/2006 | Meyer et al. | | 714/4 |
| 7,055,014 B1* | 5/2006 | Pawlowski et al. | | 711/202 |
| 7,065,611 B2* | 6/2006 | Kano | | 711/114 |
| 7,111,194 B1* | 9/2006 | Schoenthal et al. | | 714/7 |
| 7,124,169 B2* | 10/2006 | Shimozono et al. | | 709/211 |
| 7,155,463 B1* | 12/2006 | Wang et al. | | 707/204 |
| 7,165,258 B1* | 1/2007 | Kuik et al. | | 719/326 |
| 7,171,452 B1* | 1/2007 | Gole | | 709/212 |
| 7,188,194 B1* | 3/2007 | Kuik et al. | | 709/249 |
| 7,191,225 B1* | 3/2007 | Borthakur | | 709/213 |
| 7,194,543 B2* | 3/2007 | Robertson et al. | | 709/226 |
| 7,203,732 B2* | 4/2007 | McCabe et al. | | 709/217 |
| 7,249,227 B1* | 7/2007 | Pittman | | 711/154 |
| 7,260,737 B1* | 8/2007 | Lent et al. | | 714/5 |
| 7,263,597 B2* | 8/2007 | Everdell et al. | | 712/11 |
| 7,269,131 B2* | 9/2007 | Cashman et al. | | 370/217 |
| 7,274,673 B2* | 9/2007 | Beer et al. | | 370/258 |
| 7,281,062 B1* | 10/2007 | Kuik et al. | | 709/249 |
| 7,290,017 B1* | 10/2007 | Wang et al. | | 707/204 |
| 7,290,086 B2* | 10/2007 | Beardsley et al. | | 711/114 |
| 7,293,152 B1* | 11/2007 | Srinivasan et al. | | 711/202 |
| 7,340,639 B1* | 3/2008 | Lee et al. | | 714/6 |
| 7,370,078 B1* | 5/2008 | Woodruff | | 709/205 |
| 7,398,415 B2* | 7/2008 | Beer et al. | | 714/4 |
| 7,421,519 B2* | 9/2008 | Benhase et al. | | 710/36 |
| 7,467,191 B1* | 12/2008 | Wang et al. | | 709/221 |
| 7,487,381 B1* | 2/2009 | Beaman et al. | | 714/4 |
| 7,529,836 B1* | 5/2009 | Bolen | | 709/226 |
| 7,539,745 B1* | 5/2009 | Wang et al. | | 709/224 |
| 7,593,996 B2* | 9/2009 | Gole et al. | | 709/212 |
| 2002/0016827 A1* | 2/2002 | McCabe et al. | | 709/213 |
| 2002/0165961 A1* | 11/2002 | Everdell et al. | | 709/225 |
| 2003/0120822 A1* | 6/2003 | Langrind et al. | | 709/251 |
| 2003/0189930 A1* | 10/2003 | Terrell et al. | | 370/389 |
| 2004/0030768 A1* | 2/2004 | Krishnamoorthy et al. | | 709/223 |
| 2004/0103220 A1* | 5/2004 | Bostick et al. | | 709/253 |
| 2005/0008016 A1* | 1/2005 | Shimozono et al. | | 370/392 |
| 2005/0015459 A1* | 1/2005 | Gole et al. | | 709/212 |
| 2005/0015460 A1* | 1/2005 | Gole et al. | | 709/213 |
| 2005/0114315 A1* | 5/2005 | Tanner et al. | | 707/3 |
| 2005/0195660 A1* | 9/2005 | Kavuri et al. | | 365/189.05 |
| 2006/0023707 A1* | 2/2006 | Makishima et al. | | 370/389 |
| 2006/0218362 A1* | 9/2006 | McManis | | 711/162 |

OTHER PUBLICATIONS

"Red Hat Cluster Suite: Configuring and Managing a Cluster", Chapter 1. Copyright 2004. Available online at http://www.redhat.com/docs/manuals/csgfs/pdf/rh-cs-en-3.pdf.*

"Cisco Fabric Manager", Data Sheet. Copyright 1992-2005. Available online at http://www.cisco.com/en/US/products/hw/ps4159/ps4358/products_data_sheet09186a00800c4656.html.*

"Delivering High Availability Solutions with Red Hat Cluster Suite". Sep. 2003. Available online at http://www.redhat.com/whitepapers/rha/RHA_ClusterSuiteWPPDF.pdf.*

"man/na_fcp(1) manual page", Available online at http://uyema.net/netapp/man/7.0/man1/na_fcp.1.html.*

"Unix man pages : fcp", Available online at http://bama.ua.edu/cgi-bin/man-cgi?fcp+7D.*

"Configuring Fibre Channel Interfaces", Published Dec. 6, 2002. Availble online at http://www.cisco.com/univercd/cc/td/doc/product/sn5000/sn5400/sn5428/swcfg2_5/confzone.htm.*

"iSCSI-Root mini-HOWTO" by Britt Bolen. Updated Jan. 22, 2004. Available online at http://www.eludicate.com/~bolen/iscsi/.*

"IP SANs: A Guide to iSCSI, iFCP, and FCIP Protocols for Storage Area Networks" by Tom Clark, section 8.5 Internet SCSI. Published Nov. 26, 2001. Available online at http://safari5.bvdep.com/0201752778/.*

"A Guide to Understanding Veritas Volume Replicator", Veritas Volume Replicator White Paper, Jun. 2002.*

Bhide, A.; Elnozahy, E.N.; Morgan, S.P.; Siegel, A., "A comparison of two approaches to build reliable distributed file servers," Distributed Computing Systems, 1991, 11th International Conference on, pp. 616-623, May 20-24, 1991.*

Anupam Bhide, Elmootazbellah N. Elnozahy, Stephen P. Morgan, "A Highly Available Network File Server," Proceedings of the Winter 1991 USENIX Conference, Jan. 21-25, 1991, pp. 199-205.

* cited by examiner

| ADAPTER MODE | 405 |
|---|---|
| NUMBER OF VIRTUAL PORTS | 410 |
| VIRTUAL PORT DATABASE [ ] | 500 |
| LOOP TO VP INDEX [ ] | 415 |
| ⋮ | 420 |

| STATE | 505 |
|---|---|
| MODE | 510 |
| HOST | 515 |
| NODE NAME | 520 |
| PORT NAME | 525 |
| LOOP ID | 530 |
| DEVICE ID | 535 |
| ⋮ | 540 |

USER INTERFACE SYSTEM FOR A CLUSTERED STORAGE SYSTEM

RELATED APPLICATION

This application claims priority from U.S. Provisional Patent Application Ser. No. 60/534,913, filed Jan. 8, 2004 entitled USER INTERFACE SYSTEM FOR A CLUSTERED STORAGE APPLIANCE, by Vinay Gupta, et al, the contents of which are hereby incorporated by reference.

FIELD OF THE INVENTION

The present invention relates to storage systems and, in particular, to a user interface system for a clustered storage system.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising of a geographically distributed collection of interconnected communication links, such as Ethernet, that allow clients to remotely access the information to (files) on the file server. The clients typically communicate with the filer by exchanging discrete frames or packets of data according to pre-defined protocols, such as the Trans-mission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage appliance that manages data access to a set of disks using one or more block-based protocols, such as SCSI embedded in Fibre Channel (FCP). One example of a SAN arrangement, including a storage appliance suitable for use in the SAN, is described in U.S. Pat. No. 7,873,700, issued on Jan. 18, 2011, entitled MULTI-PROTOCOL STORAGE APPLIANCE THAT PROVIDES INTEGRATED SUPPORT FOR FILE AND BLOCK ACCESS PROTOCOLS, by Brian Pawlowski et al. In SCSI terminology, clients operating in a SAN environment are initiators that initiate requests and commands for data. A storage appliance is thus a target configured to respond to the requests issued by the initiators in accordance with a request/response protocol. A storage appliance may manage export control of virtual disks (vdisks) by logical names through the use of an igroup, which is a logical named entity that is assigned to one or more addresses, e.g., a World Wide Name (WWN) or iSCSI ID, associated with one or more initiators. Thus the igroup comprises a plurality of initiators associated together for ease of management.

It is advantageous for the services and data provided by a storage system, such as a storage appliance to be available for access to the greatest degree possible. Accordingly, some storage systems provide a plurality of storage appliances in a cluster, with a property that when a first storage appliance fails, the second storage appliance ("partner") is available to take over and provide the services and the data otherwise provided by the first storage appliance. When the first storage appliance fails, the second partner storage appliance in the cluster assumes the tasks of processing and handling any data access requests normally processed by the first storage appliance. One such example of a storage appliance cluster configuration is described in U.S. Pat. No. 7,260,737, issued on Aug. 21, 2007, entitled SYSTEM AND METHOD FOR TRANSPORT-LEVEL FAILOVER OF FCP DEVICES IN A CLUSTER, by Arthur F. Lent, et al. An administrator may desire to take a storage appliance offline for a variety of reasons including, for example, to upgrade hardware. In such situations, it may be advantageous to perform a user-initiated takeover operation, as opposed to a failover operation. After the takeover operation is complete, the storage appliance's data is serviced by its partner until a give-back operation is performed.

In certain known storage appliance cluster implementations, the transport medium used for communication between clients and the cluster is Fibre Channel (FC) cabling utilizing the FCP protocol (SCSI embedded in FC) for transporting data. In known failover techniques involving clusters of storage appliances, each storage appliance in the cluster maintains two physical Fibre Channel ports, namely an A port and a B port. The A port (the "local port") is utilized for processing and handling data access requests directed to the storage appliance. The B port (the "standby port") typically is in a standby mode; when a failover situation occurs, the B port is activated and "assumes the identity" of its failed partner storage appliance. At that point, the B port receives and handles data access requests directed to the failed storage appliance.

In this way, the surviving storage appliance may process requests directed to both the storage appliance and its failed partner storage appliance. Such a conventional FC failover is further described in the above-referenced patent application entitled SYSTEM AND METHOD FOR TRANSPORT-LEVEL FAILOVER OF FCP DEVICES IN A CLUSTER.

Virtual ports are utilized, in certain storage appliance cluster implementations, to reduce the number of ports required to provide failover ports for clients of a failed storage appliance (port burn). In such implementations, a plurality of virtual ports is associated with a given physical port. One such clustering system using virtual ports is described in U.S. Pat. No. 7,467,191, issued on Dec. 16, 2008, entitled SYSTEM AND METHOD FOR FAILOVER USING VIRTUAL PORTS IN CLUSTERED SYSTEMS, by Fang Wang, et al., the contents of which are hereby incorporated by reference.

Moreover, a storage appliance or system in a clustered environment may include an additional port (either physical or virtual) for use in receiving data access commands to be proxied to the partner storage system (a "proxy port" or "partner port"). In such environments, commands received by the proxy port are forwarded to the partner storage system for execution. An example of a proxying clustered storage system is described in U.S. Pat. No. 7,340,639, issued on Mar. 4, 2008, entitled SYSTEM AND METHOD FOR PROXYING DATA ACCESS COMMANDS IN A CLUSTER SYSTEM, by Herman Lee, et al.

Various commands are implemented in known user interface (UI) systems for a clustered storage system to provide a status of ports associated with the storage system. However, these commands typically do not provide information that is failover or proxy-specific such as, for example, whether a port is a virtual port or a physical port or how the port is to be used, e.g., as a failover port or a proxy port. Additionally, conventional UI systems lack the capability to set cluster modes for use of various ports in error situations. For example, although these conventional systems permit the creation of ports to be utilized during a failover or takeover, they do not include support for establishing ports for proxying data access commands or setting the use of ports on a per-initiator basis. Thus, conventional UI implementations do not have the capability to effectively manage the variety of ports in clustered storage system environments.

SUMMARY OF THE INVENTION

The disadvantages of the prior art are overcome by providing a user interface system that simplifies management of a clustered storage system (or storage appliance) environment by a system administrator. The user interface system comprises a Command Line Interface (CLI) and/or Graphical User Interface (GUI) that enables the system administrator to effectively configure and manage ports, both physical and virtual, associated with the clustered storage appliance. Management of the storage appliance is further simplified through the use of a novel command set used to, inter alia, set port options, and set a cluster mode for the storage appliance. These commands are illustratively embodied as cfmode and igroup commands that accept a variety of associated options; the commands and associated options are converted into primitive operations ("primitives") and passed to appropriate layers of a storage operating system for execution by the storage appliance. The system administrator may issue the commands via the CLI or GUI, the latter being accessed via, for example, the World Wide Web (WWW). The GUI may be implemented to map certain menu or other graphical options (such as, for example, buttons, scroll bars, etc.), to the primitives for implementing the desired operations.

Specifically, a system administrator may utilize the novel igroup command to set a USE_PARTNER option for a specific initiator group (igroup). The USE_PARTNER option permits the administrator to configure an igroup to utilize a partner port for proxy access, a standby port for failover or both. By setting the USE_PARTNER option for a specific igroup, the administrator permits initiators in the igroup to utilize the partner port for data access command proxying in the clustered storage appliance environment. By disabling the USE_PARTNER option, the administrator prevents initiators in the specified igroup from utilizing data access command proxying via the partner port.

The novel cfmode command enables the administrator to set a cluster failover mode for the clustered storage appliance environment. The cfmode command permits the administrator to set the cluster failover mode as STANDBY, PARTNER, DUAL_FABRIC or MIXED. In STANDBY mode, the storage appliances utilize standby ports and a conventional failover mechanism. In the PARTNER mode, the appliances utilize the partner ports for data access proxying. In the DUAL_FABRIC mode, which is typically set when the storage appliance has only one physical port, the storage appliance utilizes virtual ports to emulate additional active ports for clients. If the MIXED mode is set for the cluster, both the standby and partner ports are utilized.

BRIEF DESCRIPTION OF THE DRAWINGS

The above and further advantages of invention may be understood by referring to the following description in conjunction with the accompanying drawings in which like reference numerals indicate identical or functionally similar elements.

DETAILED DESCRIPTION OF ILLUSTRATIVE EMBODIMENTS

A. Clustered Storage System Environment

Figure 1:
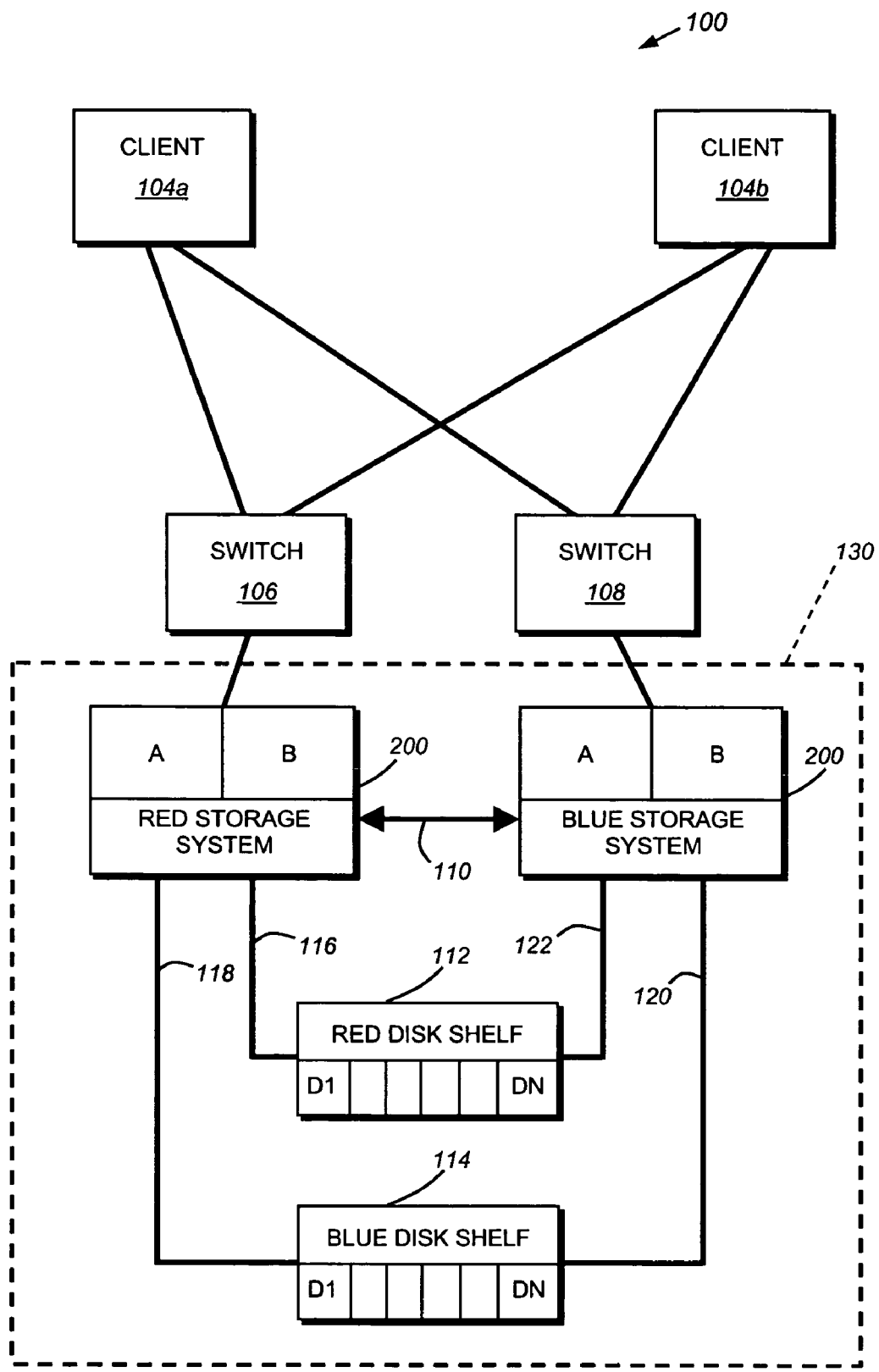
FIG. 1 is a schematic block diagram of a storage system cluster environment in accordance with an embodiment of the present invention.

FIG. 1 is a schematic block diagram of an exemplary clustered network environment 100 in which the principles of the present invention are implemented. The network 100 includes several clients 104A, B interconnected with Fibre Channel (FC) switches 106 and 108. The switches 106 and 108 are interconnected with exemplary storage systems 200 including, Red Storage System and Blue Storage System to form a clustered storage system environment configuration 130. Each storage system 200 is shown with a plurality of ports A and B connected to the switches 106 and 108. It should be noted that the ports A and B may comprise virtual ports, physical ports or a combination thereof. It should further be noted that while only two ports are shown for each storage system, in alternate embodiments of the present invention any number of ports may be utilized in accordance with the specific requirements of the cluster configuration.

A client 104 may be a general-purpose computer, such as a PC or a workstation, or a special-purpose computer, such as an application server, configured to execute applications over an operating system that includes block access protocols. Red Storage System 200 and Blue Storage System 200 are connected as two nodes of the storage system cluster 130. These storage systems, described further below, are illustratively embodied as storage appliances configured to control storage of and access to interconnected storage devices, such as disks residing on disk shelves 112 and 114.

In the illustrated example, Red Storage System 200 is connected to Red Disk Shelf 112 by a data access loop 116. It should be noted that such a data access loop can be any acceptable networking media including, for example, a Fibre Channel Arbitrated Loop (FC-AL). The Red Storage System 200 also accesses Blue Disk Shelf 114 via counterpart data access loop 118. Likewise, Blue storage system accesses Blue Disk Shelf 114 via data access loop 120 and Red Disk Shelf 112 through counterpart data access loop 122. Thus each disk shelf in the cluster is accessible to each storage appliance, thereby providing redundant data paths in the event of a failover. It should be noted that the Red and Blue disk shelves are shown directly connected to the storage systems 200 for illustrative purposes only. The disk shelves and storage systems may be operatively interconnected in any suitable FC switching network topology.

During normal cluster operation, the storage system that is connected to a disk shelf via the disk shelf's primary loop is the "owner" of the disk shelf and is primarily responsible for servicing data requests directed to blocks on volumes contained on that disk shelf. Thus, in this example, the Red storage system owns the Red Disk Shelf 112 and is primarily responsible for servicing data access requests for blocks contained on that disk shelf. Similarly, the Blue storage system is primarily responsible for the Blue disk shelf 114. When operating as storage system cluster 130, each storage system 200 is configured to take over and assume data handling capabilities for the other disk shelf in the cluster 130, e.g., in the event of a failure to the other storage system.

Connecting the Red and Blue Storage Systems is a cluster interconnect 110, which provides a direct communication link between the two storage systems. The cluster interconnect can be of any suitable communication medium, including, for example, an Ethernet connection or a FC data link.

B. Storage Appliance

Figure 2:
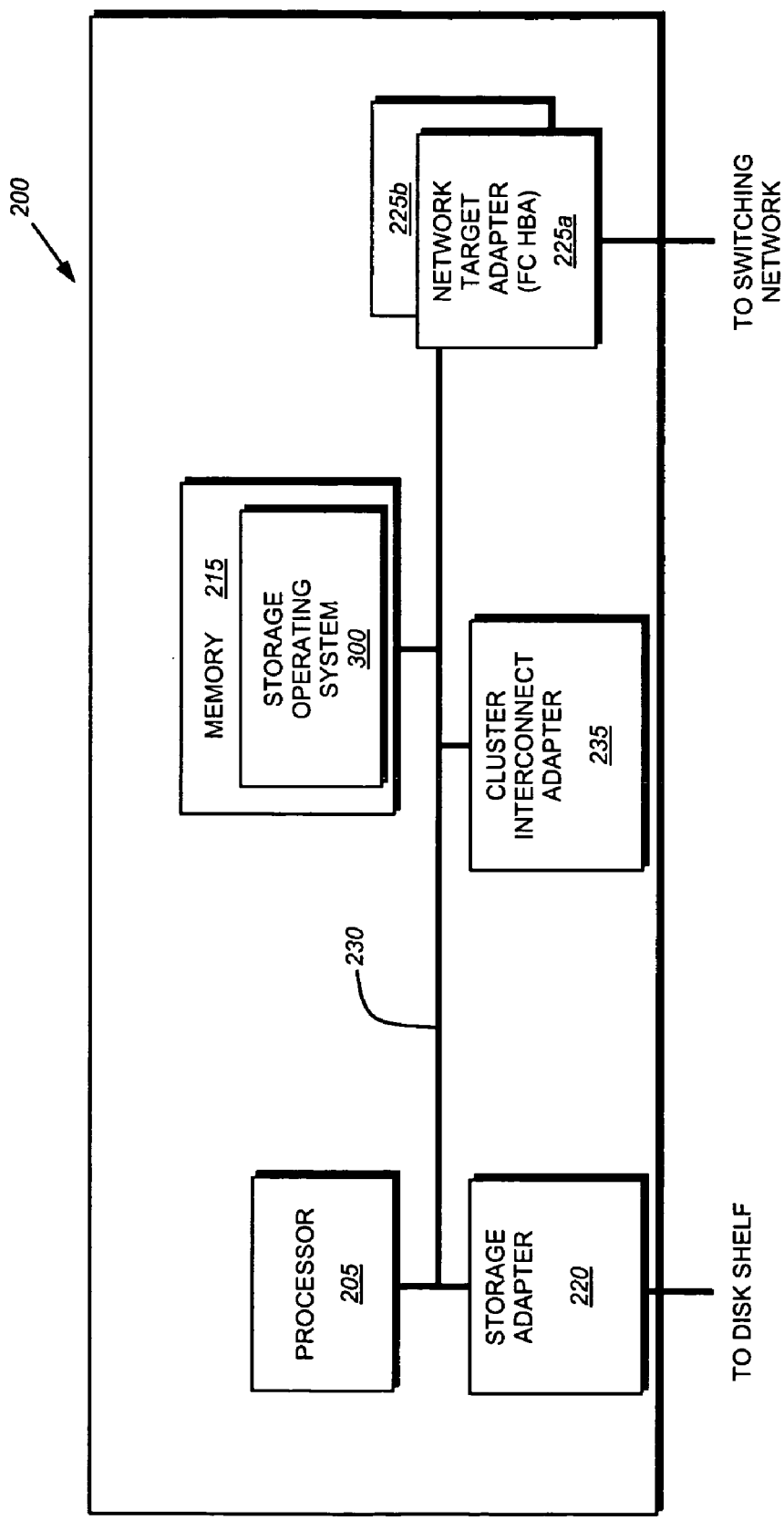
FIG. 2 is a schematic block diagram of an exemplary storage appliance in accordance with an embodiment of the present invention.

FIG. 2 is a schematic block diagram of an exemplary storage system 200 as used in the clustered network environment 100 configured to provide storage service relating to the organization of information on storage devices, such as disks. The storage system 200 is illustratively embodied as a storage appliance comprising a processor 205, a memory 215, a plurality of network adapters 225a, 225b and a storage adapter 220 interconnected by a system bus 230. A storage appliance is a computer having features such as simplicity of storage service management and ease of storage reconfiguration, including reusable storage space, for users (system administrators) and clients of network attached storage (NAS) and storage area networks (SAN) deployments. The storage appliance may provide NAS services through a file system, while the same appliance provides SAN services through SAN virtualization, including logical unit number (lun) emulation. An example of such a storage appliance is further described in the above-referenced U.S. patent application entitled MULTI-PROTOCOL STORAGE APPLIANCE THAT PROVIDES INTEGRATED SUPPORT FOR FILE AND BLOCK ACCESS PROTOCOLS. Note that the terms "storage system" and "storage appliance" are used interchangeably. The storage appliance 200 also includes a storage operating system 300 that provides a virtualization system to logically organize the information as a hierarchical structure of directory, file and virtual disk (vdisk) storage objects on the disks.

Whereas clients of a NAS-based network environment have a storage viewpoint of files, the clients of a SAN-based network environment have a storage viewpoint of blocks or disks. To that end, the multi-protocol storage appliance 200 presents (exports) disks to SAN clients through the creation of luns or vdisk objects. A vdisk object (hereinafter "vdisk") is a special file type that is implemented by the virtualization function and translated into an emulated disk as viewed by the SAN clients. Such vdisks objects are further described in U.S. Pat. No. 7,107,385, issued on Sep. 12, 2006, entitled STORAGE VIRTUALIZATION BY LAYERING VIRTUAL DISK OBJECTS ON A FILE SYSTEM, by Vijayan Rajan, et al. The storage appliance thereafter makes these emulated disks accessible to the SAN clients through controlled exports, as described further herein.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 225a and b couple the storage appliance to a plurality of clients over point-to-point links, wide area networks (WAN), virtual private networks (VPN) implemented over a public network (Internet) or a shared local area network (LAN) or any other acceptable networking architecture. The network adapters 225 a, b also couple the storage appliance 200 to a plurality of clients 104 that may be further configured to access the stored information as blocks or disks. For this SAN-based network environment, the storage appliance is coupled to an illustrative Fibre Channel (FC) switch 106, 108. The network adapters 225 may comprise a FC host bus adapter (HBA) having the mechanical, electrical and signaling circuitry needed to connect the storage appliance 200 to the switch 106, 108. In addition to providing FC access, the FC HBA may offload Fibre Channel network processing operations from the storage appliance's processor 205.

The clients may be general-purpose computers configured to execute applications over a variety of operating systems, including the UNIX® and Microsoft® Windows™ operating systems. The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 200. In SCSI terminology, clients 104 operating in a SAN environment are initiators that initiate requests and commands for data. The multi-protocol storage appliance is thus a target configured to respond to the requests issued by the initiators in accordance with a request/response protocol.

In accordance with the FC protocol, initiators and targets have three unique identifiers, a Node Name, a Port Name and a Device Identifier. The Node Name and Port Name are worldwide unique, e.g., WWNN and WWPN. A Device Identifier is unique within a given FC switching fabric and is assigned dynamically to the FC port by the FG switch 106, 108 coupled thereto. As described further below, the FC HBAs 225A, B may include support for virtual ports associated with each physical FC port. Each virtual port may have its own unique network address, comprising a WWPN and WWNN.

The appliance 200 supports various SCSI-based protocols used in SAN deployments, including SCSI encapsulated over TCP (iSCSI) and SCSI encapsulated over FC (FCP). The initiators (hereinafter clients 104) may thus request the services of the target (hereinafter storage appliance 200) by issuing iSCSI and/or FCP messages via the switches 106, 108 to access information stored on the disks. It will be apparent to those skilled in the art that the clients may also request the services of the integrated storage appliance using other block access protocols. By supporting a plurality of block access protocols, the storage appliance provides a unified and coherent access solution to vdisks/luns in a heterogeneous SAN environment.

The storage adapter 220 cooperates with the storage operating system 300 executing on the storage appliance to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 205 (or the adapter 220 itself) prior to being forwarded over the system bus 230 to the network adapters 225a and b, where the information is formatted into packets or messages and returned to the clients.

Storage of information on the storage appliance 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that cooperates with virtualization system code to provide a function that "virtualizes" the storage space provided by the disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization function allows the file system to further logically organize information as vdisks on the disks, thereby providing an integrated NAS and SAN appliance approach to storage by enabling file-based (NAS) access to the files and directories, while further emulating block-based (SAN) access to the vdisks on a file-based storage platform.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data associated with the emulated disk. The stream inode stores attributes that allow luns and exports to persist over, e.g., reboot operations, while also enabling management of the vdisk as a single disk object in relation to SAN clients.

A cluster interconnect adapter 235 of the storage appliance 200 is coupled to cluster interconnect 110 to provide communication pathway between storage appliances organized as a storage system cluster 130. Illustratively, the cluster interconnect adapter 235 comprises a FC HBA. The storage appliances exchange various types of information over the cluster interconnect 110 including, for example, a heartbeat signal, and, in accordance with the illustrative embodiment of the present invention, proxied data access commands. Configurations where data access commands are proxied across the cluster interconnect 110 are further described in the above-referenced U.S. patent entitled SYSTEM AND METHOD FOR PROXYING DATA ACCESS COMMANDS IN A CLUSTER SYSTEM.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Storage Operating System

In the illustrative embodiment, the storage operating system is the NetApp® Data ONTAP™ operating system that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 3:
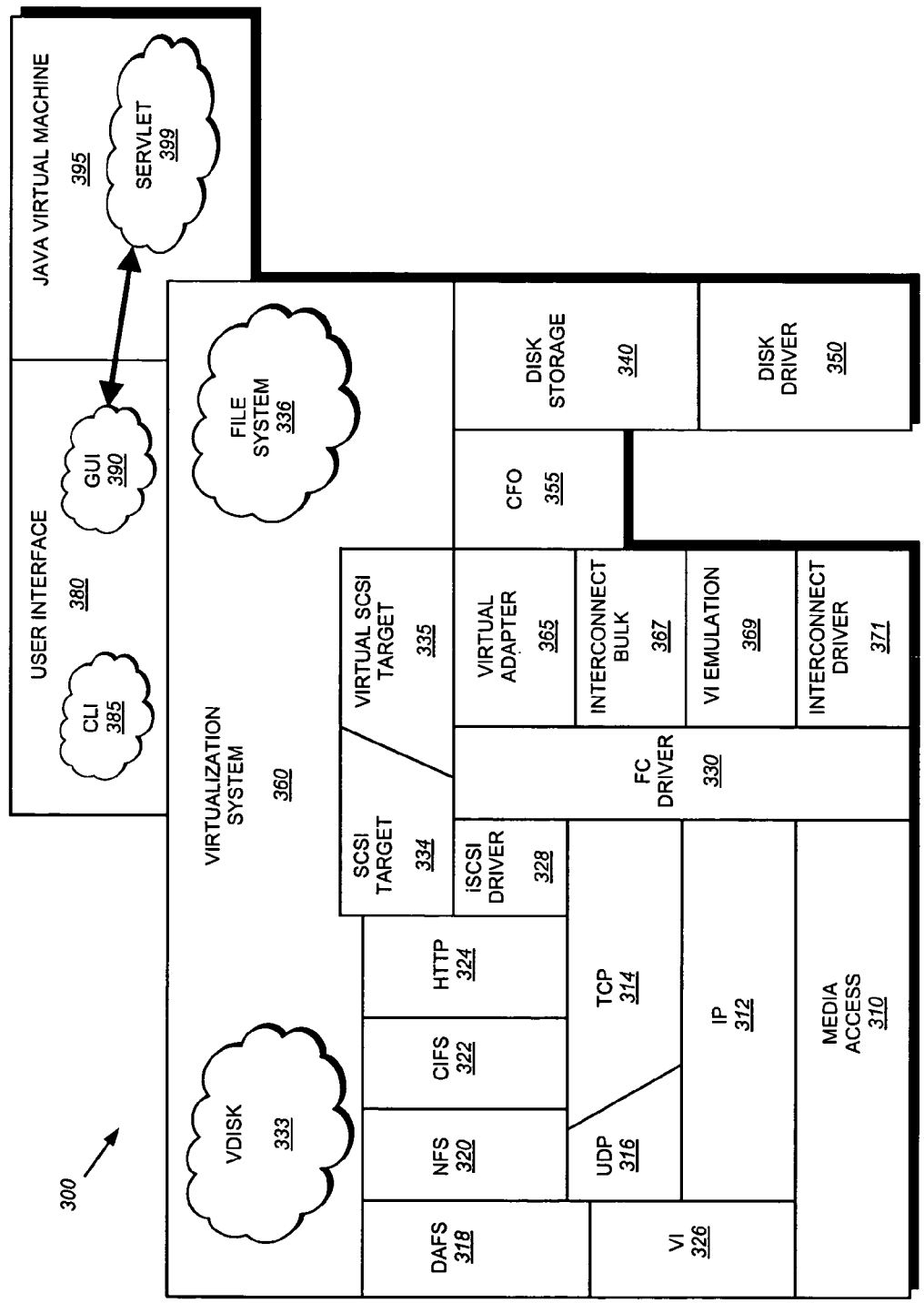
FIG. 3 is a schematic block diagram of an exemplary storage operating system for use with the exemplary storage appliance of FIG. 2 in accordance with an exemplary embodiment of the present invention.

FIG. 3 is a schematic block diagram of the storage operating system 300 that may be advantageously used with the present invention. The storage operating system comprises a series of software layers organized to form an integrated network protocol stack or multi-protocol engine that provides data paths for clients to access information stored on the multi-protocol storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318.

An iSCSI driver layer 328 provides block protocol access over the TCP/IP network protocol layers, while a FC driver layer 330 operates with the FC HBA 225 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 360 that is implemented by a file system 336 interacting with virtualization software embodied as, e.g., vdisk module 333 and SCSI target module 334. The vdisk module and SCSI target module may be implemented in software, hardware, firmware or a combination thereof. The vdisk module 333 manages SAN deployments by, among other things, implementing a comprehensive set of vdisk (lun) commands that are converted to primitive file system operations ("primitives") that interact with the file system 336 and the SCSI target module 334 to implement the vdisks.

The SCSI target module 334, in turn, initiates emulation of a disk or lun by providing a mapping procedure that translates luns into the special vdisk file types. The SCSI target module is illustratively disposed between the FC and iSCSI drivers 328, 330 and the file system 336 to thereby provide a translation layer of the virtualization system 360 between the SAN block (lun) space and the file system space, where luns are represented as vdisks. By "disposing" SAN virtualization over the file system 336, the multi-protocol storage appliance reverses the approaches taken by prior systems to thereby provide a single unified storage platform for essentially all storage access protocols.

The file system 336 illustratively implements the Write Anywhere File Layout (WAFL) file system having an on-disk format representation that is block-based using, e.g., 4 kilobyte (KB) blocks and using Modes to describe the files. A further description of the structure of the file system, is provided in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz, et al., issued Oct. 6, 1998, which patent is hereby incorporated by reference as though fully set forth herein.

A cluster failover (CFO) layer 355 of the storage operating system 300 implements various failover features including initiating a failover. Illustratively, the CFO layer 355 monitors the cluster interconnect 110 for heartbeat signals that alert the other storage appliance in the cluster that the "partner" storage appliance is operational.

The storage operating system 300 also includes virtual SCSI target module 335 disposed over an interconnect protocol stack that comprises a virtual adapter 365, an interconnect bulk 367, a VI emulation layer 369 and an interconnect driver layer 371. The virtual SCSI target module 335 provides functionality similar to that of the SCSI target 334 (although over the cluster interconnect). To that end, the virtual adapter 365 provides a software interface between the virtual SCSI target module 335 and the lower levels of the interconnect protocol stack, i.e., the virtual adapter 365 functions as an adapter driver to the interconnect protocol stack. The interconnect bulk module 367 provides flow control over the cluster interconnect 110 for proxying services. VI emulation layer 369 implements the appropriate RDMA functionality of a VI protocol over the interconnect driver 371, which directly interfaces with the cluster interconnect adapter 235 to provide data access transmissions over the cluster interconnect.

A user interface (UI) system 380, including a command line interface (CLI) 385 and a graphical user interface (GUI) 390, interacts with the virtualization system 360 to manage the storage appliance 200. In the illustrative embodiment, a Java Virtual Machine (JVM) 395 also interacts with the UI 380 to provide the novel user interface system. The JVM 395 comprises a number of servlets 399 that create appropriate GUI objects and forward them to a management console (not shown) via, e.g., the HTTP protocol layer 324. It should be noted that in alternate embodiments the GUI objects may be created using any acceptable remote GUI system, including, for example, Flash, dynamic HTML (DHTML), X-Window, etc.

D. Virtual Ports

As noted, a physical FC port may have a plurality of virtual ports associated with it. Each virtual port has a unique address and appears to other FC devices as a physical port. The use of virtual ports in a storage system cluster is further described in the above-referenced U.S. patent application entitled SYSTEM AND METHOD FOR FAILOVER USING VIRTUAL PORTS IN CLUSTERED SYSTEMS.

Each device attached to a FC network has a unique World Wide Node Name (WWNN) that illustratively is a 64-bit value. Each FC device also has one or more associated ports each of which has a unique World Wide Port Name (WWPN), that is, illustratively a 64-bit value. Each device is, thus, uniquely identified by a WWNN and one or more WWPNs.

Figure 4:
FIG. 4 is a schematic block diagram of an exemplary adapter block command structure in accordance with an embodiment of the present invention.

In the illustrative embodiment, each adapter driver, for example FC Driver 330; includes a control block data structure. An exemplary control block data structure 400 for FC driver 330 is shown in FIG. 4. The control block data structure 400 includes an adapter mode field 405, a number of virtual ports field 410, an array containing a virtual port database field 500, a loop to virtual port index array field 415 and, in alternate embodiments, additional fields 420. The adapter mode field 405 identifies whether the adapter is operating in point-to-point (PTP) or multi-ID mode. In point-to-point mode, each physical port is directly connected to another physical port on another FC device. In multi-ID mode, the storage appliance is connected to a switching fabric and therefore may require multiple virtual ports per physical port. The number of virtual ports field 410 identifies the number of virtual ports (VPs) associated with the physical port of the physical adapter, e.g., FC HBA. The virtual port database field 500, described further below, contains an array of data structures. Various database entries of the array contain various information relating to each virtual port. The loop-to-VP index field 415 contains a one-to-one mapping of target loop ID's to virtual point indexes. In accordance with the illustrative embodiment, each virtual port is associated with its own FC loop ID. Some commands passed to the adapter driver 330 may include the target loop ID as an identifier. By utilizing the mapping stored in the loop-to-VP index field 415 the driver may transform the target loop ID into the appropriate virtual port index identifying the virtual port that handles the data access request.

Figure 5:
FIG. 5 is a schematic block diagram of an exemplary virtual port database entry in accordance with an embodiment of the present invention.

An exemplary entry of the virtual port database field 500 is shown in FIG. 5. The virtual port database entry 500 includes state field 505, mode field 510, host field 515, node name field 520, port name field 525, loop field ID 530, device ID field 535 and, in alternate embodiments additional fields 540. The state field 505 identifies the current state of the virtual port, e.g. ONLINE or OFFLINE. When the virtual port is in the ONLINE state it is operational and services data access requests. When in the OFFLINE state, the virtual port may be in e.g., a STANDBY mode, awaiting a failover operation to occur so that it can assume the identity of a failed storage appliance partner's port.

The mode 510 field identifies the current mode of the virtual port. An exemplary mode may include LOCAL when the virtual port is running as a local port servicing data access requests directed to the storage appliance. Other modes may include, for example, TAKEOVER, STANDYBY and PARTNER. A port is in TAKEOVER mode when the storage appliance has executed failover or takeover operation and has assumed the identity of the partner's WWNN and WWPN. As noted, a port is in a STANDBY mode while it is awaiting a failover operation to occur. A port is in the PARTNER mode when it is accepting data access requests to be proxied to the partner in the cluster.

The host 515 field identifies which host the virtual port is running on behalf of. For example, the virtual port may be assigned to run on behalf of a specified client of the storage appliance. The node name field 520 identifies the current FC WWNN exported by the virtual port. Similarly, the port name 525 field identifies the WWPN exported by the virtual port. The WWPN and WWNN cooperate to provide a unique network address for the virtual port in a FC network. Each virtual port may be programmed to export a specific WWPN or WWNN. The loop ID 530 field identifies the loop ID assigned to the virtual port. The device ID 535 field identifies the unique FC device ID assigned to the virtual port. A FC Device ID is a unique identifier that is assigned to each FC device in a FC network.

E. Initiator Groups

An igroup is a logical named entity that is assigned to one or more addresses, e.g., WWN or iSCSI IDs, associated with one or more initiators (depending upon whether a clustered environment is configured). The storage appliance manages export control of vdisks by logical names through the use of igroup. When an igroup is created, the addresses are essentially "bound" (associated) to a logical igroup name. Therefore, rather than having to specify these IDs when desiring access to a vdisk, an administrator need only specify the name of the igroup.

In the illustrative embodiment, vdisks (luns) are "layered" on top of igroups. The igroup abstracts the underlying details of "naming" (i.e., identification) of clients or initiators that desire access to the vdisks. The naming details (for purposes of allowing access to a vdisk/lun by a client/initiator) may be completely different between block access protocols, such as FCP and iSCSI. However, the logical naming of igroups is consistent with the FC and SCSI standards; the user interface system, described herein, represents an application of those standards that simplifies access to the vdisks. The igroup abstraction thus decouples implementation of addressing from the underlying details of addressing. In other words, an igroup allows a user to define client or related clients addressing by logical names that are then used by higher layer vdisk (lun) commands to allow access. As a result, a vdisk (lun) can be easily shared over iSCSI and FCP, thereby allowing use in applications such as a mixed iSCSI or FCP cluster. Moreover, reorganization or upgrades of client/initiators do not affect security assignments (allowing access) at the lun level, since they are indirect via the logical igroup name.

Figure 6:
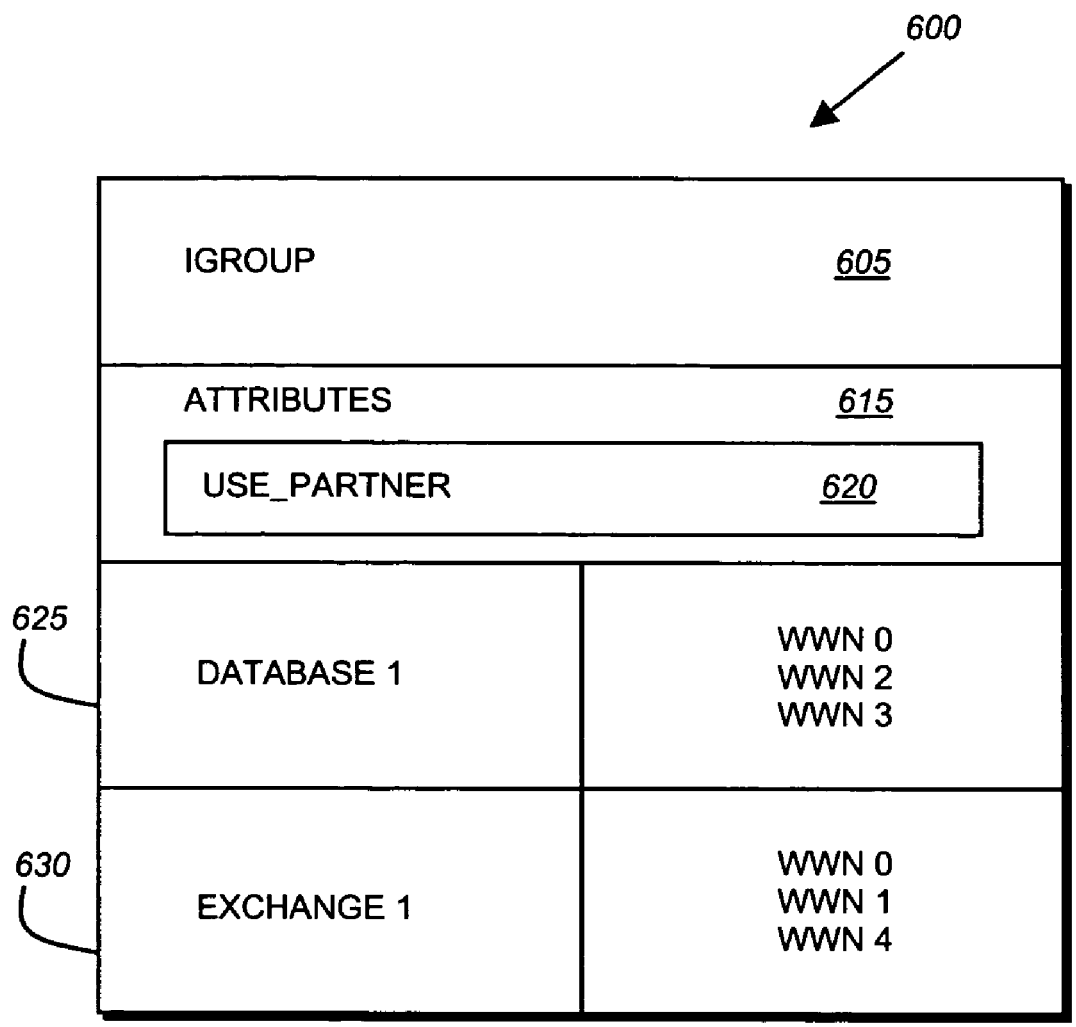
FIG. 6 is a schematic block diagram of an exemplary initiator group data structure in accordance with an embodiment of the present invention.

FIG. 6 is a schematic representation of an igroup data structure 600 having a plurality of igroup definition entries that may be advantageously used with the present invention. Each definition includes an igroup field 605 that identifies a particular human friendly igroup name and an address field that identifies one or more addresses (e.g., WWN addresses or iSCSI IDs) associated with one or more initiators assigned to the igroup. For example, igroup "database 1" is assigned a plurality of WWN 64-bit hexadecimal values 0, 2, 3, each of which associates a particular initiator member to that igroup. Similarly, igroup "exchange 1" is assigned WWN values 0, 1, 4, each associating an initiator member to that igroup. Also included is a set of attributes 615 that are "global" to a particular igroup. One example of an attribute is a USE_PARTNER attribute 620, described further below.

The user interface system 380 provides a method of assigning a lun ID to a vdisk and specifying the igroup of initiators that are allowed access to the vdisk, i.e., the clients to which the vdisk is exported. Each igroup has certain associated attributes, such as transport protocol type and operating system type of its member initiators (node names). For example, the initiators within an igroup illustratively support the FCP and iSCSI transport protocol type. The operating system type attribute refers to the operating system type of the member initiators in the igroup. This latter attribute is provided because a SCSI target (such as the multiprotocol storage appliance) often "behaves" differently when interacting with different operating systems (e.g., Solaris, Windows, and Linux) of the initiators. Processing of a request received at the storage appliance occurs at lower layers of the storage operating system. Since addresses (WWN or iSCSI IDs) are bound to igroup names, these lower layers "know" whether the request is received over, e.g., an iSCSI or FCP transport.

The igroup need not be homogeneous in terms of these attributes, i.e., an igroup can contain initiators having different combinations of FCP and iSCSI as a transport. For example, iSCSI and FCP initiators may be combined into a single igroup. In addition, an igroup can support various operating system initiator members. This allows operations, such as graceful rolling upgrade of a FC SAN cluster to an iSCSI cluster, with no application downtime. In addition, membership of the igroups can be modified at any time, i.e., initiators can be added to or removed from an igroup and, as a consequence, inherit or lose the mappings of the igroup, respectively.

F. User Interface

Management of the storage appliance is simplified through the use of the novel user interface (UI) system 380, as well as the cfmode and igroup command set available to the system administrator. The CLI 385 and GUI 390 of the UI 380 implement the igroup and cfmode command set to, among other things, set the USE_PARTNER attribute 620 for an igroup, and/or set the cluster mode of ports used in a cluster environment. As noted, commands entered via the UI, whether via the CLI or GUI, are converted to file system primitives used by, e.g., the vdisk module 333 of the virtualization system 360 to execute the desired operations.

Command Line Interface

An illustrative example of the igroup command is:

igroup set <igroupname> USE_PARTNER [yes/no]

wherein the <igroupname> parameter indicates the name of the igroup to be operated upon. The set command indicates that the option following the parameter is to be set to the specified value. The USE_PARTNER option specifies whether members of the igroup <igroupname> can use the partner port for proxying data access commands. If the USE_PARTNER option is set (i.e. igroup set igroupname USE_PARTNER yes) then initiators in the igroup will not utilize standby ports or perform conventional failover operations in the event of a failure. Instead, those initiators utilize the partner port to access luns in the event of an error condition. If the USE_PARTNER option is not set for an igroup, then the members of the igroup can use the standby ports and perform conventional takeover operations. In certain embodiments, the USE_PARTNER option may be automatically set to a predefined value and the igroup command may not permit an administrator to modify the USE_PARTNER option.

The igroup command and the creation of the appropriate igroup data structures using file system primitive operations are further described in U.S. patent application Ser. No. 10/421,576, entitled CONSISTENT LOGICAL NAMING OF INITIATOR GROUPS, by Mohan Srinivasan, et al.

An illustrative example of the cfmode (cluster mode) command is:

cfmode <mode> wherein the <mode> parameter defines the cluster failover mode that the system is to operate. Examples of modes include PARTNER, STANDBY, DUAL_FABRIC and MIXED. In the MIXED mode, both the standby and partner ports are utilized when a storage system has initiated a takeover operation. The standby ports are utilized by those initiators able to communicate and utilize the standby ports for failover operations. Such initiators include, for example, Solaris, Windows and Linux-based initiators. Those initiators that are unable to utilize the standby ports use the partner ports in connection with the proxy data access command capabilities of the partner ports. Examples of such initiators adapted to utilize proxy or partner ports include AIX and HP-UX-based initiators. In the PARTNER mode, partner ports of a storage appliance accept data access commands to be proxied to the partner storage appliance over the cluster interconnect. In a TAKEOVER mode, these partner ports continue to service traffic on behalf of the partner. In the DUAL_FABRIC mode, which is typically only se when the storage appliance has only one physical port, the physical port utilizes virtual ports on the physical port to provide for failover capabilities. In the STANDBY mode, the standby ports are used when a storage appliance is in a takeover state. These ports take over the appropriate network address including, for example the WWNN and WWPN of the partner storage appliance during the takeover procedure.

In an alternate embodiment, the cfmode command is implemented as an option to a fcp command that provides for total management of all FCP options associated with a storage appliance. In such embodiments, an illustrative use of the cfmode command would be:

fcp set cfmode <MODE> wherein fcp identifies the command, set the desired subcommand and cfmode the value that is being set. In this embodiment, the cfmode command functions as a variable to be set by the use of the fcp command. Additionally, an illustrative command to view the current cfmode set for a storage appliance is:

fcp show cfmode.

Such a command will result in an output to the CLI of the current cfmode of the storage appliance.

Figure 7:
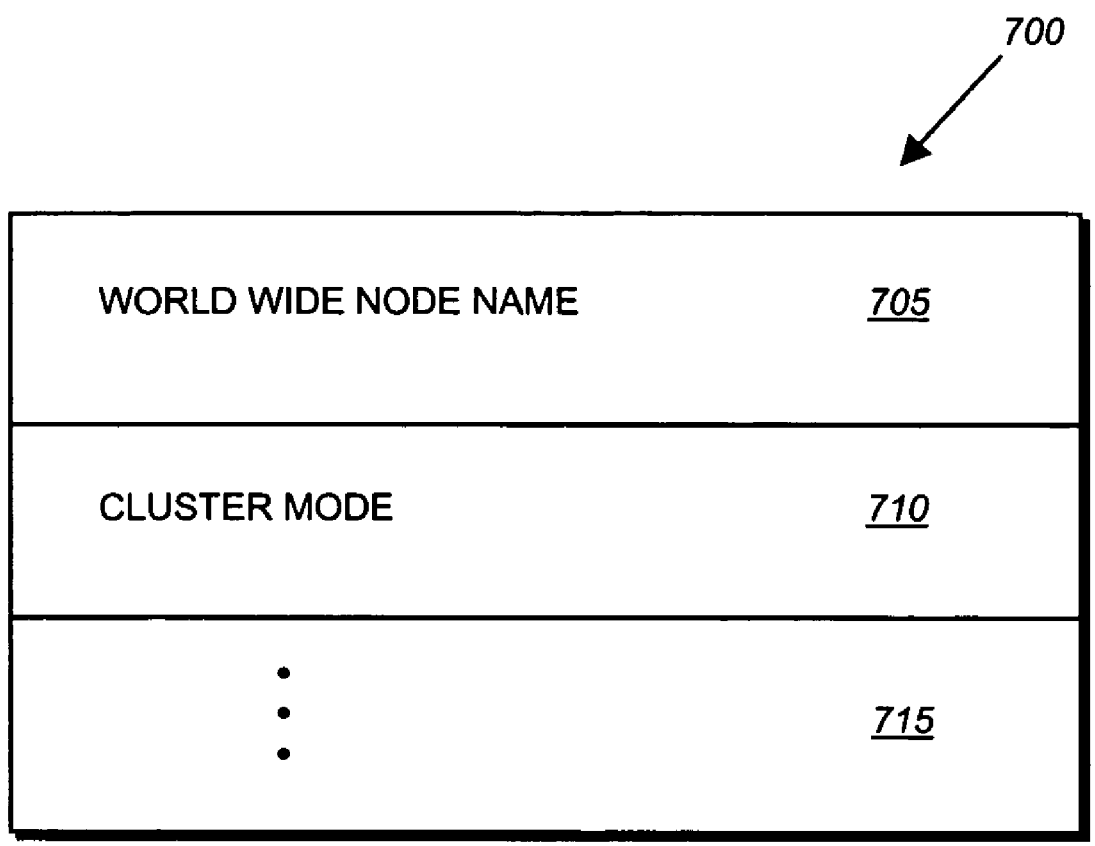
FIG. 7 is a schematic block diagram of an exemplary failover configuration data structure in accordance with an embodiment of the present invention.

FIG. 7 is a schematic block diagram of an exemplary configuration data structure 700 in accordance with an embodiment of the present invention. The configuration data structure 700 is typically stored in a storage operating system registry or in a configuration file, depending on particular embodiments of the storage system. The configuration data structure 700 includes a World Wide Node Name field 705, a cluster mode field 710, and in alternate embodiments, additional fields 715. The World Wide Node Name field 705 stores the WWNN associated with the storage appliance. The cluster mode field 710 stores the cluster mode that has been set on the storage appliance by, for example the use of the cfmode command as described above.

Graphical User Interface

The GUI may be implemented on the storage appliance to allow a user or administrator easy access to the management functionality contained in the igroup/cfmode command set. By providing a GUI, in addition to the CLI commands, the storage appliance may be initialized with fewer references to manuals and/or other aids for the administrator. Additionally, the GUI may provide additional graphical and/or table reporting data that is not available via the CLI. Such consolidated reporting is further described in U.S. patent application Ser. No. 09/862,949, entitled SYSTEM AND METHOD FOR CONSOLIDATED REPORTING OF CHARACTERISTICS FOR A GROUP OF FILE SYSTEMS, by Brian M. Hackworth.

The GUI provides an alternative to the CLI for executing clustered management commands. Additionally, the GUI may be easy to use for inexperienced system administrators and may enable fast initialization of cluster configurations by, as noted, removing the need to reference manuals for specific commands. The GUI may be implemented in a variety of environments including, for example, a Microsoft Windows environment, an X-Window based workstation environment, or other graphical user interface system environments. Alternately, the GUI may be accessed through a browser via the World Wide Web.

In one embodiment, the GUI converts a series of menu options or other graphical interactions into a CLI command, which is then executed using, for example, remote shell (RSH) technology. In other embodiments, the GUI includes appropriate conventional program code to directly generate file system primitives for performing requested actions. For example, the Java Virtual Machine (JVM) 395 (shown in FIG. 3) may include a number of servlets 399 that interface with the GUI 390 of the user interface 380. Each servlet 399 may implement the various user interface functionality described below by, for example, generating HTML pages "on-the-fly" for display at a remote location via the World Wide Web. The servlet may communicate directly with the HTTP layer 324 of the storage operating system to send HTML requests and receive user selections. In alternate embodiments, the creation of GUI web-based pages may be accomplished using other techniques of dynamic remote graphical user interface generation including, for example, dynamic HTML (DHTML), Flash technology, or the like.

Figure 8:
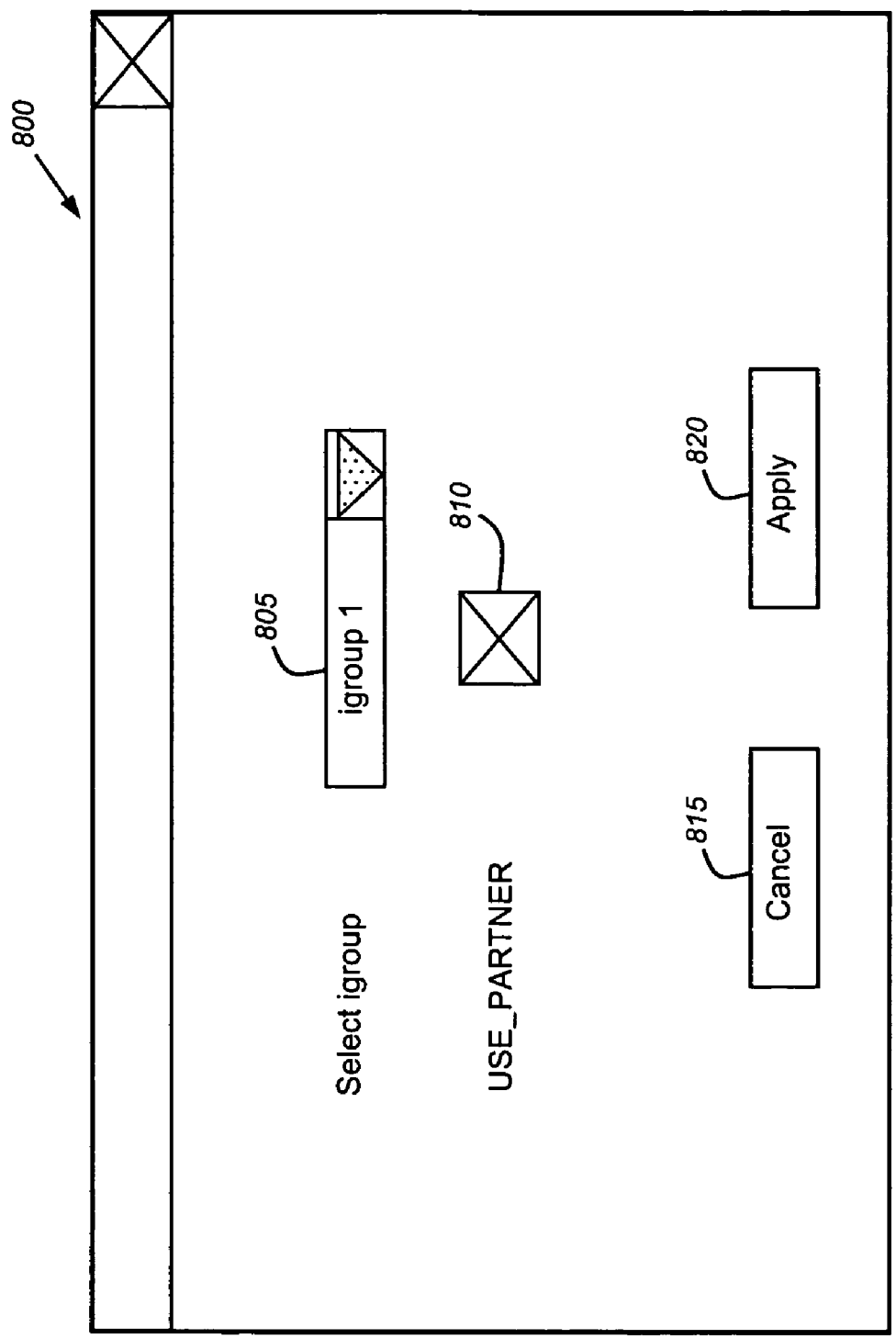
FIG. 8 is a view of a graphical user interface (GUI) window for setting a USE_PARTNER option for an initiator group in accordance with an embodiment of the present invention.
Figure 9:
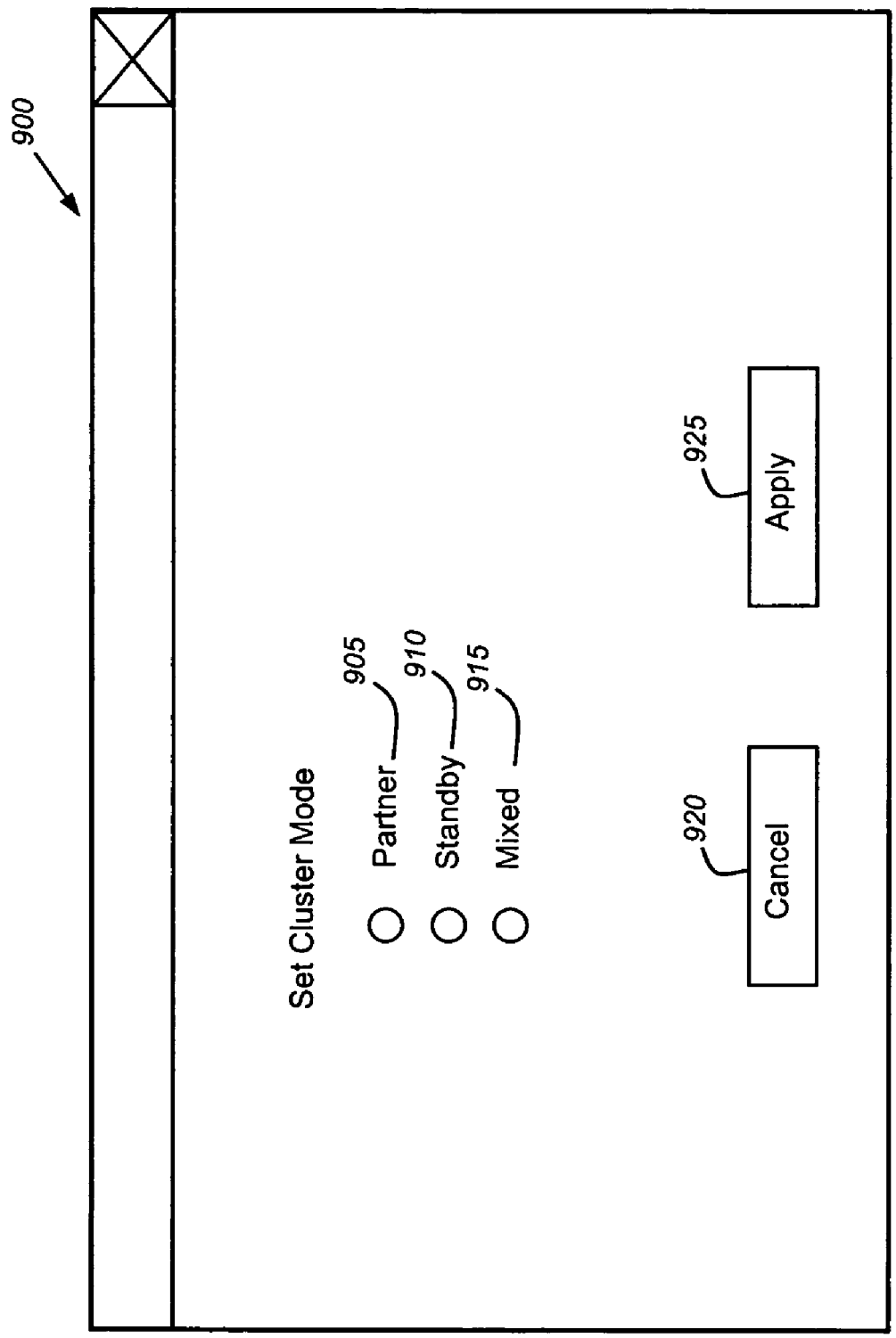
FIG. 9 is a view of a GUI window for setting a cluster mode in accordance with an embodiment of the present invention.

FIGS. 8 and 9 illustrate exemplary GUI windows pertaining to the igroup and cfmode command set functionality in accordance with the present invention. Specifically, FIG. 8 illustrates a window 800 for selecting the USE_PARTNER option of an igroup. The window 800 includes a drop-down igroup selector menu 805 that permits a user or administrator to select an igroup. The window 800 also includes a USE_PARTNER check box 810 for selecting or deselecting the USE_PARTNER option. The window 800 also illustratively includes a cancel button 815 configured to cancel a pending action and an apply button 820 configured to apply the noted change to the USE_PARTNER option. It should be noted that the window 800 is shown for illustrative purposes only and that in alternate embodiments additional features or elements may be added to the window without deviating from the spirit or scope of the invention.

Similarly, FIG. 9 shows a GUI window 900 for setting a cluster mode of a storage system. The window 900 includes a partner option 905, a standby option 910 and a mixed option 915 adapted to select the mode as partner, standby or mixed, respectively. The window 900 also includes a cancel button 920 and an apply button 920 adapted to cancel or apply the selected cluster mode, respectively.

To again summarize, the present invention is directed to a novel user interface for use with storage appliances that support virtual ports and/or proxying data access requests via a data access port. Ease of use features permit the use of CLI commands to set a USE_PARTNER option for an igroup and to set a cluster mode. In certain embodiments, various options may not be presented to an administrator. For example, in an embodiment, administrators may not be permitted to set the USE_PARTNER setting for a particular igroup.

The foregoing description has been directed to specific embodiments of this invention. It will be apparent, however, that other variations and modifications may be made to the described embodiments, with the attainment of some or all of their advantages. Specifically, it should be noted that any number of HBAs may be utilized in accordance with the invention. Additionally, any number of virtual ports may be associated with a given physical port. The procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A system configured to simplify management of a clustered storage system having a plurality of failover modes, the system comprising:
a user interface system that allows a user to define the plurality of failover modes in the clustered storage system, wherein each failover mode automatically configures one or more ports on a selected storage system or a partner storage system in response to a failover condition, wherein the partner storage system is configured to receive requests directed to the partner storage system and the selected storage system, each failover mode further configuring the partner storage system with a world wide node name and a world wide port name from the selected storage system to allow the partner storage system to assume an identity of the selected storage system; and
a command set implemented by the user interface system, the command set including a first command and a second command,
the first command configured to permit the user to specify a specific initiator group (igroup) to utilize the one or more ports for data access proxying in the clustered storage system wherein the igroup is a logical named entity assigned to one or more addresses that are associated with one or more initiators and the igroup is used by higher layer vdisk commands to allow the data access proxying to the partner storage system,
the second command configured to set a cluster mode, the cluster mode including at least one of the plurality of failover modes in which a storage system is to operate,
wherein the command set further provides information specific to failover operations of the one or more ports to the user on the user interface system.

2. The system of claim 1 wherein the user interface system comprises a command line interface (CLI) configured to support the command set.

3. The system of claim 1 wherein the command set further comprises an igroup command that determines whether a set of initiators may utilize data access command proxying.

4. The system of claim 3 wherein the set of initiators comprises at least one fibre channel world wide name.

5. The system of claim 3 wherein the set of initiators comprises one or more iSCSI identifiers.

6. The system of claim 3 wherein the igroup command sets an igroup option to determine whether members of a set of initiators may use a partner port for proxying data access command.

7. The system of claim 3 wherein the command set further comprises a cfmode command that sets a cluster mode for the clustered storage system.

8. The system of claim 7 wherein the cluster mode enables the clustered storage system to proxy data access requests received by a first storage system in the clustered storage system to a second storage system in the clustered storage system.

9. The system of claim 7 wherein the cluster mode enables a first storage system in the clustered storage system to assume an identity of a second storage system in the clustered storage system.

10. The system of claim 7 wherein the cluster mode enables proxying of data access requests received by a first storage system in the clustered storage system to a second storage system in the clustered storage system and further enables the first storage system to assume an identity of the second storage system.

11. The system of claim 1 wherein the command for setting a cluster mode comprises a cfmode command.

12. The system of claim 1 wherein the user interface system further comprises a graphical user interface having functionality to implement the command set.

13. The system of claim 1 wherein the igroup allows a user to define related clients by a logical name.

14. The system of claim 1 wherein data access at a lun level is not affected by reorganization of the initiators.

15. The system of claim 1 wherein data access proxying comprises receiving, at a proxy port of a first storage system, a command to be forwarded to a second storage system for execution.

16. A method for simplifying management of a clustered storage system having a plurality of failover modes, comprising:
    providing a user interface system that allows a user to define the plurality of failover modes in the clustered storage system wherein each failover mode automatically configures one or more ports on a selected storage system or a partner storage system in response to a failover condition, wherein the partner storage system is configured to receive requests directed to the partner storage system and the selected storage system, each failover mode further configuring the partner storage system with a world wide node name and a world wide port name from the selected storage system to allow the partner storage system to assume an identity of the selected storage system; and
    executing a command set supported by the user interface system, the command set including a first command and a second command,
        the first command configured to permit the user to specify a specific initiator group (igroup) to utilize the one or more ports for data access proxying in the clustered storage system wherein the igroup is a logical named entity assigned to one or more addresses that are associated with one or more initiators and the igroup is used by higher layer vdisk commands to allow the data access proxying to the partner storage system,
        the second command configured to set a cluster mode for the clustered storage system, the cluster mode defining one of the plurality of failover modes in which a storage system is to operate,
    wherein the command set further provides information specific to failover operations of the one or more ports to the user on the user interface system, and each failover mode automatically configures the one or more ports on the selected storage system or the partner storage system in response to the failover condition, the partner storage system configured to receive requests directed to the partner storage system and a failed storage system.

17. The method of claim 16 wherein the cluster mode comprises a partner mode; and
    wherein the clustered storage system is enabled to proxy data access requests received by a first storage system in the clustered storage system to a second storage system.

18. The method of claim 16 wherein the cluster mode comprises a standby mode; and
    wherein a first storage system in the clustered storage system is enabled to assume an identity of a second storage system in the clustered storage system.

19. The method of claim 16 further comprising providing a GUI implementing commands available through the user interface system.

20. The method of claim 16 further comprising providing a GUI window for setting a cluster mode of the clustered storage system.

21. The method of claim 19 further comprising providing a GUI window for setting a proxy option for an initiator group.

22. A system configured to simplify management of a clustered storage system having a plurality of failover modes, the system comprising:
    a user interface means for implementing a command line interface that allows a user to define the plurality of failover modes in a the clustered storage system wherein each failover mode automatically configures one or more ports on a selected storage system or a partner storage system in response to a failover condition, wherein the partner storage system is configured to receive requests directed to the partner storage system and the selected storage system, each failover mode further configuring the partner storage system with a world wide node name and a world wide port name from the selected storage system to allow the partner storage system to assume an identity of the selected storage system; and
    means for executing a command set, the command set including a first command and a second command,
        the first command configured to permit the user to specify a specific initiator group (igroup) to utilize the one or more ports for data access proxying in the clustered storage system wherein the igroup is a logical named entity assigned to one or more addresses that are associated with one or more initiators and the igroup is used by higher layer vdisk commands to allow the data access proxying to the partner storage system, and
        the second command configured to set a cluster mode, the cluster mode defining one of the plurality of failover modes in which a storage system is to operate,
    wherein the command set further provides information specific to failover operations of the one or more ports to the user on the user interface system.

23. The system of claim 22 further comprising means for determining whether a set of initiators may utilize data access command proxying.

24. The system of claim 22 wherein user interface means further comprises means for determining whether a set of initiators may utilize data access command proxying.

25. The system of claim 24 wherein the set of initiators comprises at least one fibre channel world wide name.

26. The system of claim 24 wherein the set of initiators comprises one or more iSCSI identifiers.

27. The system of claim 22 wherein the cluster mode enables the clustered storage system to proxy data access requests received by a first storage system in the clustered storage system to a second storage system in the clustered storage system.

28. The system of claim 22 wherein the cluster mode enables a first storage system in the clustered storage system to assume an identity of a second storage system in the clustered storage system.

29. The system of claim 22 wherein the cluster mode enables proxying of data access requests received by a first storage system in the clustered storage system to a second storage system in the clustered storage system and further enables the first storage system to assume an identity of the second storage system.

30. A non-transitory computer readable medium containing executable program instructions executed by a processor, for simplifying management of a clustered storage system having a plurality of failover modes, the computer readable medium comprising:
program instructions that provide a user interface system that allows a user to define the plurality of failover modes in the clustered storage system,
wherein each failover mode automatically configures one or more ports on a selected storage system or a partner storage system in response to a failover condition, and
wherein the partner storage system is configured to receive requests directed to the partner storage system and the selected storage system, each failover mode further configuring the partner storage system with a world wide node name and a world wide port name from the selected storage system to allow the partner storage system to assume an identity of the selected storage system; and
program instructions that execute a command set supported by the user interface system to set a cluster mode for the clustered storage system, the command set including a first command and a second command,
the first command configured to permit the user to specify a specific initiator group (igroup) to utilize the one or more ports for data access proxying in the clustered storage system wherein the igroup is a logical named entity assigned to one or more addresses that are associated with one or more initiators and the igroup is used by higher layer vdisk commands to allow the data access proxying to the partner storage system,
the second command the cluster mode defining one of a plurality of failover modes in which a storage system is to operate,
wherein the command set further provides information specific to failover operations of the one or more ports to the user on the user interface system.

31. The computer readable medium of claim 30 wherein the cluster mode comprises a partner mode; and
wherein the clustered storage system is enabled to proxy data access requests received by a first storage system in the clustered storage system to a second storage system.

32. The computer readable medium of claim 30 wherein the cluster mode comprises a standby mode; and
wherein a first storage system in the clustered storage system is enabled to assume an identity of a second storage system in the clustered storage system.

33. The computer readable medium of claim 30 further comprising the step of providing a GUI implementing commands available through the user interface system.

34. The computer readable medium of claim 30 further comprising the step of providing a GUI window for setting a cluster mode of the clustered storage system.

35. The computer readable medium of claim 30 further comprising the step of providing a GUI window for setting a proxy option for an initiator group.

36. A system, comprising:
an interface that defines a plurality of failover modes for a clustered storage system that allows a user to define a plurality of failover modes in a clustered storage system
wherein each failover mode automatically configures one or more ports on a selected storage system or a partner storage system in response to a failover condition, and
wherein the partner storage system is configured to receive requests directed to the partner storage system and the selected storage system, each failover mode further configuring the partner storage system with a world wide node name and a world wide port name from the selected storage system to allow the partner storage system to assume an identity of the selected storage system; and
a command set implemented by the interface, the command set including a first command and a second command,
the first command configured to permit the user to specify a specific initiator group (igroup) to utilize the one or more ports for data access proxying in the clustered storage system wherein the igroup is a logical named entity assigned to one or more addresses that are associated with one or more initiators and the igroup is used by higher layer vdisk commands to allow the data access proxying to the partner storage system,
the second command configured to set a cluster mode using one of the plurality of failover modes, in which a storage system is to operate,
wherein the command set further provides information specific to failover operations of the one or more ports to the user on the user interface system.

37. The system of claim 36, wherein the interface comprises a command line interface (CLI) configured to support the command set.

38. The system of claim 36, wherein the command set further comprises an igroup command that determines whether a set of initiators may utilize data access command proxying.

39. The system of claim 38, wherein the set of initiators comprises at least one fibre channel world wide name.

40. The system of claim 38, wherein the set of initiators comprises one or more iSCSI identifiers.

41. The system of claim 38, wherein the igroup command sets an igroup option to determine whether members of a set of initiators may use a partner port for proxying data access command.

42. The system of claim 36, wherein the cluster mode enables the clustered storage system to proxy data access requests received by a first storage system in the clustered storage system to a second storage system in the clustered storage system.

43. The system of claim 36, wherein the cluster mode enables a first storage system in the clustered storage system to assume an identity of a second storage system in the clustered storage system.

44. The system of claim 36, wherein the cluster mode enables proxying of data access requests received by a first storage system in the clustered storage system to a second storage system in the clustered storage system and further enables the first storage system to assume an identity of the second storage system.

45. A method, comprising:
providing an interface that defines a plurality of failover modes in a clustered storage system wherein the cluster storage system includes a plurality of servers
wherein each failover mode automatically configures one or more ports on a selected storage system or a partner storage system in response to a failover condition, and
wherein the partner storage system is configured to receive requests directed to the partner storage system and the selected storage system, each failover mode further configuring the partner storage system with a world wide node name and a world wide port name from the selected storage system to allow the partner storage system to assume an identity of the selected storage system;
selecting a command set supported by the interface to set a cluster mode for the clustered storage system, the command set including a first command and a second command,
the first command configured to permit the user to specify a specific initiator group (igroup) to utilize the one or more ports for data access proxying in the clustered storage system wherein the igroup is a logical named entity assigned to one or more addresses that are associated with one or more initiators and the igroup is used by higher layer vdisk commands to allow the data access proxying to the partner storage system,
the second command configured the cluster mode defining one of a plurality of failover modes in which a storage system is to operate,
wherein the command set further provides information specific to failover operations of the one or more ports to the user on the user interface system; and
configuring the clustered storage system into the selected cluster mode.

46. The method of claim 45, wherein the interface is a command line interface.

47. The method of claim 45, wherein the interface is a graphical user interface.

48. The method of claim 45, wherein the selected cluster mode enables the clustered storage system to proxy data access requests received by a first storage system in the clustered storage system to a second storage system in the clustered storage system.

49. The method of claim 45, wherein the selected cluster mode enables a first storage system in the clustered storage system to assume an identity of a second storage system in the clustered storage system.

50. The method of claim 45, wherein the cluster mode enables proxying of data access requests received by a first storage system in the clustered storage system to a second storage system in the clustered storage system and further enables the first storage system to assume an identity of the second storage system.

51. A system configured to simplify management of a clustered storage system having a plurality of failover modes, the system comprising:
an interface system that defines the plurality of failover modes in the clustered storage system automatically responding to a failover condition, wherein each failover mode configures one or more ports on a selected server or a partner server in response to a failover condition, each failover mode further configuring the partner storage system with a world wide node name and a world wide port name from the selected storage system to allow the partner storage system to assume an identity of the selected storage system; and
a command set implemented by the interface system, the command set including a first command and a second command,
the first command configured to permit the user to specify a specific initiator group (igroup) to utilize the one or more ports for data access proxying in the clustered storage system wherein the igroup is a logical named entity assigned to one or more addresses that are associated with one or more initiators and the igroup is used by higher layer vdisk commands to allow the data access proxying to the partner storage system,
the second command configured to set a cluster mode where the cluster mode includes one of the plurality of failover modes in which a storage system is to operate,
wherein the command set further provides information specific to failover operations of the one or more ports to the user on the user interface system.

52. The system of claim 51, wherein the plurality of failure modes comprises a standby mode, a partner mode, a dual fabric mode, and a mixed mode.

* * * * *

UNITED STATES PATENT AND TRADEMARK OFFICE
CERTIFICATE OF CORRECTION

PATENT NO.      : 7,966,294 B1                           Page 1 of 1
APPLICATION NO. : 10/797669
DATED           : June 21, 2011
INVENTOR(S)     : Vinay Gupta It is certified that error appears in the above-identified patent and that said Letters Patent is hereby corrected as shown below:

In Col. 10, line 20:
byte (KB) blocks and using ~~Modes~~ inodes to describe the files. A Signed and Sealed this
Tenth Day of April, 2012

David J. Kappos
*Director of the United States Patent and Trademark Office*